United States Patent
Nagata

(10) Patent No.: US 7,155,636 B2
(45) Date of Patent: Dec. 26, 2006

(54) METHOD FOR DETECTING FAULTS BETWEEN STORAGE DEVICES AND STORAGE DEVICES USING THE SAME

(75) Inventor: Koji Nagata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 10/402,686

(22) Filed: Mar. 28, 2003

(65) Prior Publication Data

US 2003/0233603 A1 Dec. 18, 2003

(30) Foreign Application Priority Data

Mar. 28, 2002 (JP) ............................ 2002-092684

(51) Int. Cl.
*G06F 11/00* (2006.01)
(52) U.S. Cl. .................... 714/8; 714/4; 714/5; 714/43
(58) Field of Classification Search .................... 714/4, 714/5, 42, 43, 712, 717, 8; 370/242, 244, 370/253, 248, 250, 241, 214, 245; 709/138, 709/212, 214
See application file for complete search history.

(56) References Cited

U.S. PATENT DOCUMENTS

| | | | |
|---|---|---|---|
| 5,271,000 A | 12/1993 | Engbersen | |
| 5,343,463 A | 8/1994 | van Tetering et al. | |
| 5,499,235 A | 3/1996 | Houdoin et al. | |
| 5,790,287 A | 8/1998 | Darcie | |
| 5,812,528 A | 9/1998 | Van Dervort | |
| 5,815,295 A | 9/1998 | Darcie | |
| 5,975,738 A * | 11/1999 | DeKoning et al. | ............. 700/79 |
| 6,147,998 A | 11/2000 | Kelley | |
| 6,438,714 B1 * | 8/2002 | Canestaro et al. | ............. 714/42 |
| 6,490,253 B1 * | 12/2002 | Miller et al. | ................. 370/241 |
| 6,678,839 B1 * | 1/2004 | Mori | ........................... 714/44 |
| 6,683,856 B1 | 1/2004 | Brinkman | |
| 6,754,853 B1 * | 6/2004 | DeKoning et al. | ............. 714/42 |
| 6,766,466 B1 * | 7/2004 | Jibbe | ............................. 714/4 |
| 6,862,697 B1 * | 3/2005 | Moran et al. | .................. 714/43 |
| 6,865,689 B1 * | 3/2005 | Gibson et al. | .................. 714/8 |
| 6,889,345 B1 * | 5/2005 | Sicola et al. | ................... 714/43 |
| 6,904,544 B1 * | 6/2005 | DeRolf et al. | ................. 714/43 |
| 2002/0071391 A1 | 6/2002 | Isioka | |
| 2002/0181406 A1 | 12/2002 | Iwata et al. | |

FOREIGN PATENT DOCUMENTS

| | | |
|---|---|---|
| EP | 0748079 A2 | 12/1996 |
| EP | 1011047 A2 | 6/2000 |
| EP | 0993633 B1 | 11/2001 |

OTHER PUBLICATIONS definition of "random." www.dictionary.com, accessed Aug. 5, 2005.*
National Committee for Information Technology Standards. "Fibre Channel—Methodology for Jitter Specifications." Technical Report Rev 10, Jun. 9, 1999. Annex B, pp. 33-47.*
"Fault Recovery in Multichannel Links", IBM Technical Disclosure Bulletin 37:673-674 (Feb. 1994).

* cited by examiner

*Primary Examiner*—Robert Beausoliel
*Assistant Examiner*—Philip Guyton
(74) *Attorney, Agent, or Firm*—Townsend and Townsend and Crew LLP

(57) ABSTRACT

Processing of heavy load data transfer is executed among a plurality of storage devices interconnected through a communication line. Faults are detected in accordance with a result of the data transfer processing to enable detection of faults on a data path.

14 Claims, 3 Drawing Sheets

METHOD FOR DETECTING FAULTS BETWEEN STORAGE DEVICES AND STORAGE DEVICES USING THE SAME

CROSS-REFERENCE TO RELATED APPLICATIONS

The present invention claims priority up on Japanese Patent Application No. 2002-92684 filed on Mar. 28, 2002, which is herein incorporated by reference.

BACKGROUND OF THE INVENTION

1. Field of the Invention

The present invention relates to a method for detecting faults between storage devices, and a storage device used for the method.

2. Description of the Related Art

A data storage apparatus such as a disk array apparatus has a function of transferring data between storage devices. The storage devices are interconnected by using a communication line such as a Fibre Channel. If maintenance is carried out when faults occur in the communication line, checking must be executed as to recovery of the communication line. As a simple diagnosis technology to check on such recovery, for example, Japanese Patent Laid-open Publication No. 2000-315165 discloses a data acquisition and distribution device for running maintenance. In the data acquisition and distribution device, when a operational mode is switched from an on-line state to an off-line state, a test is conducted in which a set of identical test packets are sent/received between a communicating device through the communication line. That is, a time duration from transmission of test packets to the communicating device, to receiving a last returned test packet. If the time duration is within specified time, it is determined that the communicating device and the communication line are normal. On the other hand, if the time duration exceeds the specified time, it is determined that the communicating device and the communication line are faulty.

Such a maintenance test for operation is conducted to check on whether the devices of both sides and the communication line are normal or not.

The above-described maintenance test is a simple diagnosis for sending/receiving test packets between the data acquisition and distribution devices. Though it is only a light-load test for the data acquisition and distribution devices and the communication line, this test enables detection of permanent faults.

However, temporary faults or faults dependent on certain conditions may not be detected. For example, faults which occur in the case of heavy load operation such as copying of data between disk devices cannot be found. Thus, if a system is actually operated after completion of maintenance work or initial setting of a path, the same fault may be repeated, which necessitates the maintenance work to be carried out all over again.

SUMMARY OF THE INVENTION

The present invention was made with the foregoing problems in mind, and one object of the present invention is to provide a method for detecting faults between storage devices, and a storage device used for the method.

One aspect of the present invention provides a fault detecting method on a data path among a plurality of storage devices interconnected through a communication line, comprising executing heavy load data transfer through the data path, detecting a fault on the data path in accordance with a result of the data transfer, fixing the detected fault on the data path, and resuming normal data transfer by using the fixed data path.

In this case, the heavy load means that so as to conduct a test of fault detection similar to a real operation in execution of the data transfer processing, for example, the amount of data to be transferred is increased as much as possible to set a heavy load.

Another aspect of the present invention provides A storage device for detecting a fault on a data path communicating with another storage device, comprising an interface circuit for transferring data to/from the another storage device, a disk device, a disk interface circuit for transferring data to/from the disk device, a data transfer circuit for transferring data between the interface circuit and the disk interface circuit, and a controller for executing heavy load data transfer through the data path by using the data transfer circuit.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

Figure 1A:
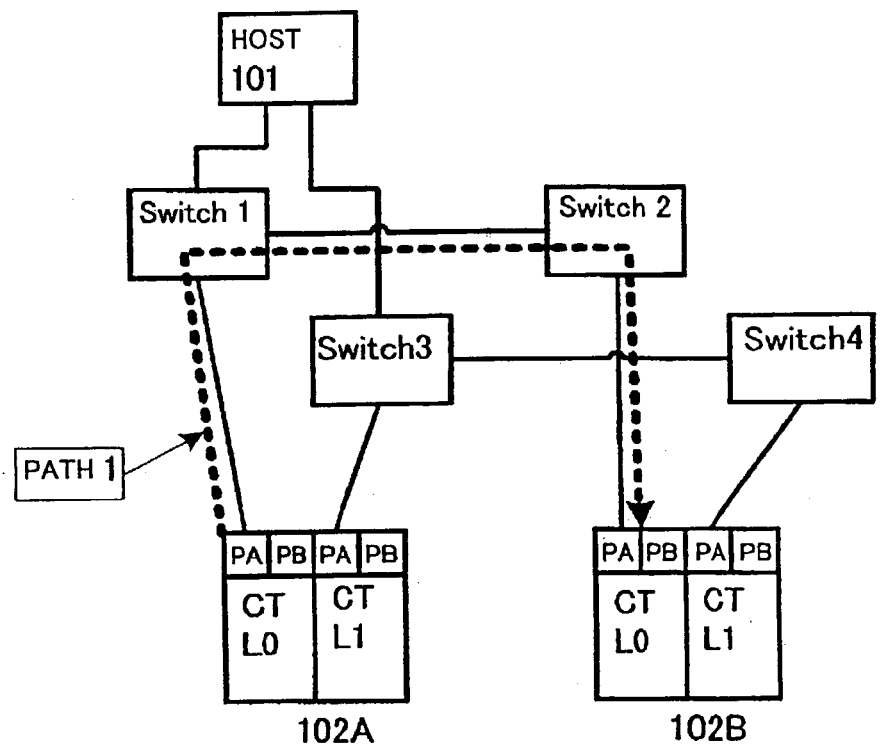
FIGS. 1A and 1B show a schematic diagram showing a method for detecting faults between storage devices according to an embodiment of the present invention.

FIG. 1A is a schematic diagram showing a method for detecting faults between storage devices. As shown in FIG. 1A, a pair of storage devices 102A and 102B constituted of a disk array device are interconnected through a path (data path) 1. Here, the path is a data transmission line for interconnecting ports (PA, PB) of controllers (CTL0, CTL1) between the storage devices 102A and 102B via optional switches 1 to 4 interconnected through a communication line, and an optional path is properly set. A host device 101 is connected to the storage devices 102A and 102B via the optional switches 1 to 4 interconnected through the communication line. For example, a "Remotecopy" command is received from the host device 101, and data transfer is executed between the storage devices 102A and 102B through the path 1.

Figure 2:
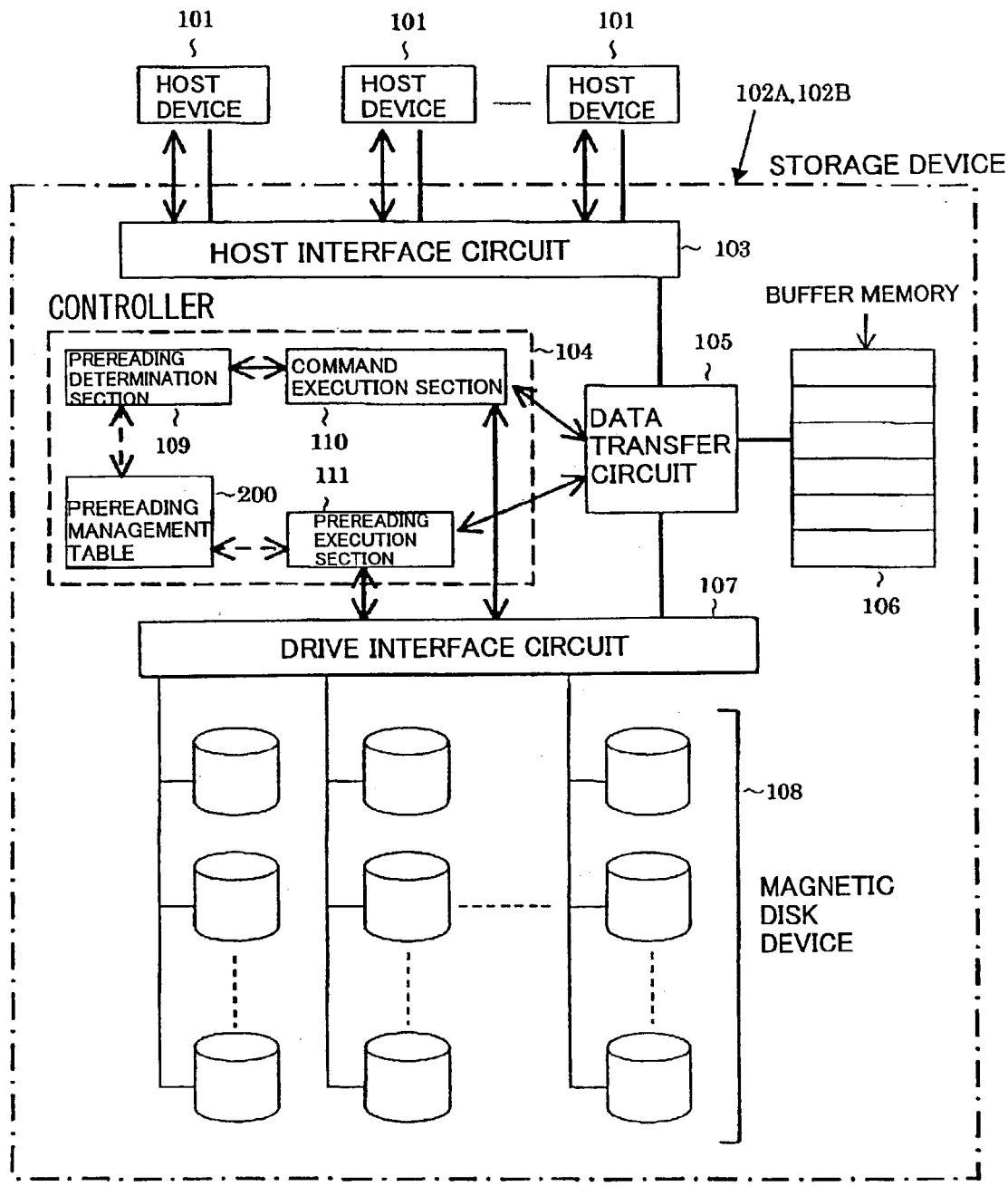
FIG. 2 is a block diagram showing a constitutional example of a storage device according to an embodiment of the present invention.

FIG. 2 shows a particular example of a configuration of the storage devices 102A and 102B. That is, each of the storage devices 102A and 102B of the present embodiment has a control unit 104, a data transfer circuit 105, a buffer memory 106, and a magnetic disk device 108.

The control unit 104 performs overall control of the storage device 102 including command receiving from the host device 101 and control of the magnetic disk device 108. The data transfer circuit 105 executes data transfer among the host device 101, the buffer memory 106, and the magnetic disk device 108 through each interface circuit. For the magnetic disk device 108, for example, a disk array technology such as RAID or the like can be employed, in which data including parity data for data integrity or the like are stored in many inexpensive and compact magnetic disk devices in a dispersed manner.

Figure 1B:
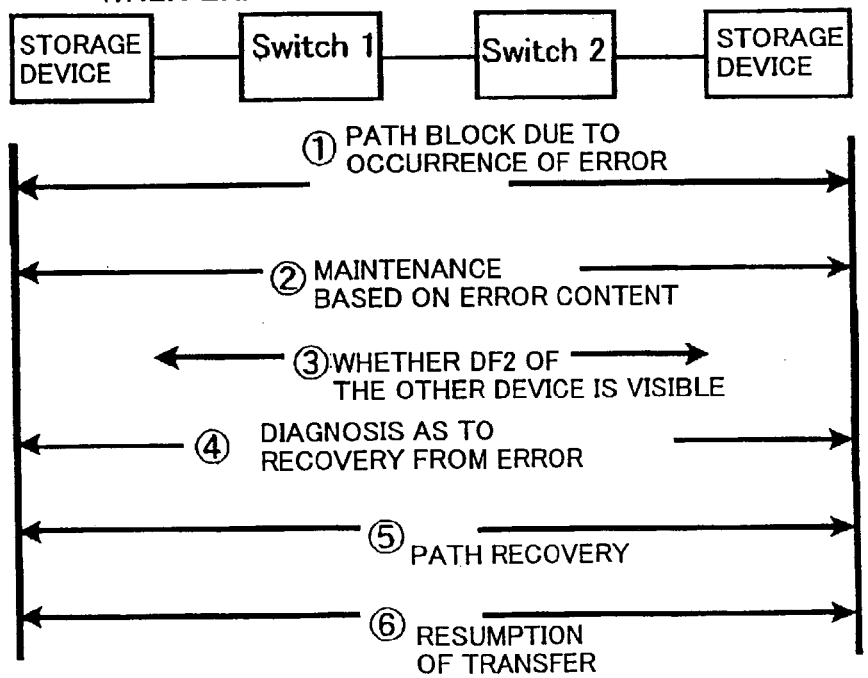

Now, description is made of a case where an error occurs as a fault in data transfer between the storage devices 102A and 102B through the path 1 as shown in FIG. 1B. When the error occurs on the path 1 and the path 1 is blocked ((1) in the drawing), this fault is detected by the controller CTL0 of the storage device 102A. The controller CTL0 that has detected the fault executes a self-recovery operation called "automatic path recovery function," or notifies the fault detection to a maintenance terminal at a remote place for remote fault monitoring services. As other error indications, an error lamp of the storage device 102A may be lit, or a notice may be sent to the host device 101. Based on a content of the error notified to the maintenance terminal, for example, a maintenance engineer is called out to carry out maintenance work ((2) in the drawing). An example of this maintenance work will be described later. After the execution of the maintenance work, between the storage devices 102A and 102B on the path 1, first, checking is made on whether the path 1 as a data transmission line has been recovered or not ((3) in the drawing), and the maintenance work is continued until its recovery.

If the path 1 has been recovered to an operational level, checking is made on nonoccurrence of the same faults even if data is transferred between the storage devices 102A and 102B in an actual operation state. That is, in order to detect a fault of the data path, predetermined heavy load data transfer is executed. A fault can be detected based on a result of the data transfer. Then, diagnosis is made as to whether the error has really been fixed or not ((4) in the drawing). For this fault detection, there are various methods as described later. An example of the diagnosis of the error recovery will also be described later. If the recovery of the path 1 is confirmed after the diagnosis ((5) in the drawing), the data transfer that has been interrupted is resumed ((6) in the drawing).

Figure 3:
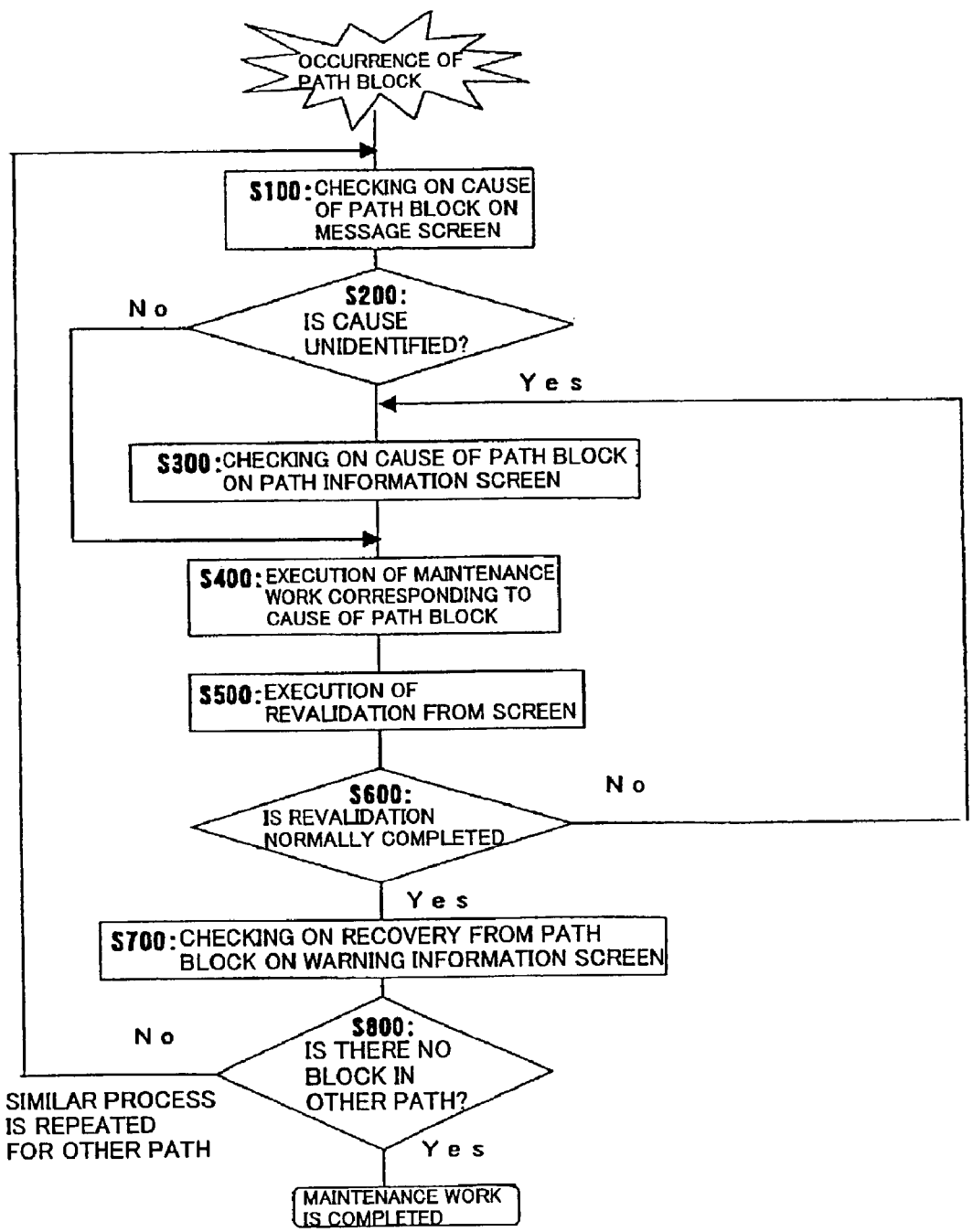
FIG. 3 is a flowchart showing a specific example of maintenance work for faults between the storage devices according to one embodiment of the present invention.

An example of the above-described maintenance work is now briefly described by referring to a flowchart of FIG. 3. In FIG. 3, symbol "S" denotes "step." First, when a fault of path block occurs, a cause of the path block is displayed on a screen showing a message of a display of the maintenance terminal, and the displayed cause is checked by the maintenance engineer (S100). In this checking, if a cause of the path block cannot be identified (S200: YES), a screen showing information regarding the path is displayed on the display to check a cause of the path block (S300). Then, maintenance work is carried out for the cause of the path block checked by the maintenance engineer (S400). On the other hand, if a cause of the path block is identified (S200: NO), the maintenance work of this step S400 is also carried out. After the execution of the maintenance work, the maintenance engineer executes an operation for revalidating the repaired and maintained path by means of the screen showing the information regarding the path (S500). Checking is made on whether the revalidation operation has been normally completed or not. If normal completion is not determined (S600: NO), the processing of step S300 described above is executed. On the other hand, if normal finish of the path revalidation operation is determined (S600: YES), checking is made on recovery from the path block on a display screen for warning information (S700). Then, checking is made on occurrence of path block of the other transmission system (S800). If occurrence of path block is detected in the other transmission system (S800: NO), the process returns to the processing of step S100, and the above process from step S100 to S800 is repeated. If nonoccurrence of path block is determined in the other transmission system (S800: YES), a series of maintenance work is completed.

Next, description is made of an embodiment for fault detection after maintenance work. As described above with reference to the flowchart in FIG. 3, if the block of the path 1 is corrected, and the path 1 is considered to have recovered, the process returns to the actual operation state, and checking is made as to nonoccurrence of any same faults even if data transfer is executed between the storage devices 102A and 102B in FIG. 1A.

In order to detect a fault of the data path, predetermined heavy load data transfer is executed to detect a fault in accordance with a result of the data transfer. Then, diagnosis is made as to whether recovery has been really made or not from the error. For the fault detection, there are various methods. For example, the following three methods (1) to (3) are depicted.

[(1) Two-way data transfer]

As data transfer, data reading and writing are both executed from the storage device 102A to the storage device 102B in FIG. 1A. As data reading, data transfer is executed in a direction from the storage device 102A to the storage device 102B. As data writing, data transfer is executed in a direction from the storage device 102B to the storage device 102A. In other words, between the storage devices 102A and 102B, data transfer is executed not in one way but back and forth.

In this case, faults (errors) that cannot be detected in one-way data transfer can be detected. Accordingly, a fault detection test similar to a real operation can be conducted, whereby it is no longer required to carry out maintenance work again after the error detection. In addition, the amount of data to be transferred is set as large as possible to become a high load. Thus, a fault detection test similar to a real operation can be conducted.

[(2) Random data transfer]

As data transfer, data generated at random are transferred from the storage device 102A to the storage device 102B in FIG. 1A. For example, data of various patterns such as data of all "zero" or "IF" by hexadecimal notation may be transferred.

Thus, faults demonstrating high error frequency in only particular data patterns or in particular data can be detected. Therefore, fault detection test simulating a real operation can be conducted, whereby it is no longer required to carry out maintenance work again after the error detection. In addition, the amount of data to be transferred is set as large as possible to become a heavy load. Thus, a fault detection test simulating a real operation can be conducted.

[(3) Data transfer between fault detection drives]

As data transfer, data are transferred from a particular drive (magnetic disk device, such as magnetic disk device 108 in FIG. 2) of the storage device 102A in FIG. 1A to a particular drive of the storage device 102B in FIG. 1A. The particular drive installed in each of the storage devices 102A and 102B is prepared beforehand for fault detection.

Data transfer is not executed between the buffer memories 106 of the storage devices 102A and 102B but between the drives prepared for fault detection. Accordingly, faults that occur only because of access to the drive can be detected. Thus, fault detection test similar to a real operation can be conducted, whereby it is no longer required to carry out maintenance work again after the error detection. In addition, the amount of data to be transferred is set as large as possible to become a heavy load. Therefore, a fault detection test similar to a real operation can be conducted.

[Diagnosis]

Results of various fault detections described above are diagnosed. For example, if a fault occurs in data writing on a Fibre Channel interconnecting the storage devices 102A and 102B, diagnosis focusing on data transfer concerning the writing is executed. If an error status is returned with respect to a command issued to the storage device 102B, diagnosis focusing on the status is executed.

According to the embodiments of the present invention, under conditions similar to a real operation, diagnosis can be processed as work for checking a normal operation. For example, heavy load I/O diagnosis is executed during data path setting or maintenance. Thus, faults that may occur during an actual operation can be accurately detected. That is, faults that may occur not only in a light-load operation but also in a heavy load operation can be detected. For example, temporary faults, faults dependent on certain conditions, or faults after maintenance/repairing can be detected with high possibility. It is possible to prevent wasteful work such as repetition of maintenance work for the same fault.

Although the preferred embodiment of the present invention has been described in detail, it should be understood that various changes, substitutions and alterations can be made therein without departing from spirit and scope of the inventions as defined by the appended claims.

What is claimed is:

1. A fault detecting method on a data path between two disk storage devices among a plurality of disk storage devices interconnected through a communication line, comprising:
    obtaining a selected fault detection test from a group of tests comprising a first fault detection test, a second fault detection test, and a third fault detection test;
    performing data transfer operations over a data path between a first disk storage device and a second disk storage device in accordance with said selected fault detection test;
    detecting a fault in said data path based on a result of said data transfer;
    signaling an indication of said fault in order to initiate a repair action; and
    resuming normal data transfer by using said data path at a time subsequent to said repair actions,
    wherein said first fault detection test comprises steps of:
        performing a read operation wherein data on said first disk storage device is read therefrom and stored to said second disk storage device; and
        performing a write operation wherein data stored on said second disk storage device is read therefrom and stored to said first disk storage device,
    wherein said second fault detection test comprises steps of:
        generating random data;
        storing said random data in said first disk storage device; and
        transferring said random data from said first disk storage device to said second disk storage device,
    wherein said first and second disk storage devices each comprises a plurality of disk drives and said third fault detection test comprises steps of:
        designating a disk drive in said first disk storage device as a first fault detection drive;
        designating a disk drive in said second disk storage device as a second fault detection drive; and
        reading out data stored in said first fault detection drive and storing said data onto said second fault detection drive.

2. A fault detecting method according to claim 1, wherein for said first fault detection test, said read operation is performed by transferring the maximum amount of data that is possible between said first and second disk storage devices.

3. A fault detecting method according to claim 1, wherein for said first fault detection test, said write operation is performed by transferring the maximum amount of data that is possible between said first and second disk storage devices.

4. A fault detecting method according to claim 1, wherein said data path among said plurality of storage devices comprises a path using Fibre Channel.

5. A fault detecting method according to claim 1, wherein for said second fault detection test, said transferring is performed by transferring the maximum amount of data that is possible between said first and second disk storage devices.

6. A fault detecting method on a data path according to claim 1, further comprising executing one or more validation data transfers through said data path subsequent to completion of said repair operation, each validation data transfer comprising an amount of data that is sufficient to simulate a predetermined data transfer load.

7. A fault detecting method on a data path between two disk storage devices among a plurality of disk storage devices interconnected through a communication line, comprising:
    obtaining a selected fault detection test from a group of tests comprising a first fault detection test, a second fault detection test, and a third fault detection test;
    performing data transfer operations over a data path between a first disk storage device and a second disk storage device in accordance with said selected fault detection test;
    detecting a fault in said data path based on a result of said data transfer;
    signaling an indication of said fault in order to initiate a repair action; and
    resuming normal data transfer by using said data path at a time subsequent to said repair action, wherein said step of executing the data transfer includes transferring data between a predetermined disk device in said first storage device and a predetermined disk device in said second storage devices,
    wherein said first fault detection test comprises steps of:
        performing a read operation wherein data on said first disk storage device is read therefrom and stored to said second disk storage device; and
        performing a write operation wherein data stored on said second disk storage device is read therefrom and stored to said first disk storage device,
    wherein said second fault detection test comprises steps of:
        generating random data;
        storing said random data in said first disk storage device; and transferring said random data from said first disk storage device to said second disk storage device, wherein said first and second disk storage devices each comprises a plurality of disk drives and said third fault detection test comprises steps of:

designating a disk drive in said first disk storage device as a first fault detection drive;

designating a disk drive in said second disk storage device as a second fault detection drive; and reading out data stored in said first fault detection drive and storing said data onto said second fault detection drive.

8. A disk storage device for detecting a fault on a data path communicating with another disk storage device, comprising:

an interface circuit for transferring data with said another disk storage device;

a plurality of disk drives;

a disk interface circuit for transferring data with one or more of said disk drives;

a data transfer circuit operative with said interface circuit and said disk interface circuit for transferring data between said disk drives and disk drives comprising said another disk storage device; and a controller operable to:

detect a fault in said data path based on a result of a data transfer between said interface circuit and said disk interface circuit;

indicate occurrence of said fault in order to initiate a repair action; and initiate a validation data transfer action with said another disk storage device subsequent to completion of said repair action, said validation data transfer action selected from a group consisting of: a first action, a second action, and a third action, wherein said first action comprises steps of:

performing a read operation wherein data on said disk storage device is read therefrom and stored to said another disk storage device; and performing a write operation wherein data stored on said another disk storage device is read therefrom and stored to said disk storage device, wherein said second action comprises steps of:

generating random data;

storing said random data in said disk storage device; and transferring said random data from said disk storage device to said another disk storage device, wherein said third action comprises steps of:

designating a disk drive in said disk storage device as a first fault detection drive;

designating a disk drive in said another disk storage device as a second fault detection drive; and reading out data stored in said first fault detection drive and storing said data onto said second fault detection drive.

9. A storage device according to claim 8, wherein said controller controls to resume said data transfer by using a recovered data path.

10. A storage device according to claim 8, wherein for said first action, said read operation is performed by transferring the maximum amount of data that is possible between said disk storage device and said another disk storage devices.

11. A storage device according to claim 8, wherein for said first action, said write operation is performed by transferring the maximum amount of data that is possible between said disk storage device and said another disk storage device.

12. A storage device according to claim 8, wherein for said second action, said transferring is performed by transferring the maximum amount of data that is possible between said disk storage device and said another disk storage devices.

13. A storage device according to claim 8, wherein said data path comprises a Fibre Channel.

14. A fault detecting method on a data path between at least two disk storage devices interconnected through a communication line, the method comprising:

obtaining a selected fault detection test from a group of tests comprising a first fault detection test, a second fault detection test, and a third fault detection test;

performing data transfer operations over a data path between a first disk storage device and a second disk storage device in accordance with said selected fault detection test;

detecting a fault in said data path based on result of said data transfers, wherein said first fault detection test comprises steps of:

performing a read operation wherein data on said first disk storage device is read therefrom and stored to said second disk storage device; and performing a write operation wherein data stored on said second disk storage device is read therefrom and stored to said first disk storage device, wherein said second fault detection test comprises steps of:

generating random data;

storing said random data in said first disk storage device; and transferring said random data from said first disk storage device to said second disk storage device, wherein said first and second disk storage devices each comprises a plurality of disk drives and said third fault detection test comprises steps of:

designating a disk drive in said first disk storage device as a first fault detection drive;

designating a disk drive in said second disk storage device as a second fault detection drive; and reading out data stored in said first fault detection drive and storing said data onto said second fault detection drive.

* * * * *